(12) United States Patent
Matsumura et al.

(10) Patent No.: US 11,912,214 B2
(45) Date of Patent: Feb. 27, 2024

(54) WIRING MODULE AND POWER STORAGE MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Nobuyuki Matsumura, Mie (JP); Shinichi Takase, Mie (JP); Hiroki Shimoda, Mie (JP); Hideo Takahashi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 125 days.

(21) Appl. No.: 17/780,753

(22) PCT Filed: Nov. 25, 2020

(86) PCT No.: PCT/JP2020/043737
§ 371 (c)(1),
(2) Date: May 27, 2022

(87) PCT Pub. No.: WO2021/124814
PCT Pub. Date: Jun. 24, 2021

(65) Prior Publication Data
US 2022/0410821 A1    Dec. 29, 2022

(30) Foreign Application Priority Data
Dec. 16, 2019  (JP) .................................. 2019-226509

(51) Int. Cl.
*B60R 16/02* (2006.01)
*H01M 10/48* (2006.01)
(Continued)

(52) U.S. Cl.
CPC ........ *B60R 16/0207* (2013.01); *H01M 10/486* (2013.01); *H01M 50/298* (2021.01); *H01M 50/507* (2021.01); *H01M 2220/20* (2013.01)

(58) Field of Classification Search
CPC ............ B60R 16/0207; H01M 50/507; H01M 10/486; H01M 2220/20; H10M 50/298
See application file for complete search history.

(56) References Cited

U.S. PATENT DOCUMENTS

2018/0248167 A1* 8/2018 Hashizawa ......... H01M 10/425
2020/0033196 A1   1/2020 Tanaka
2020/0333192 A1  10/2020 Takase et al.

FOREIGN PATENT DOCUMENTS

EP    3525279 A1 *  8/2019  .......... H01M 10/486
JP    06-080141       11/1994
(Continued)

OTHER PUBLICATIONS

International Search Report issued in International Bureau of WIPO Patent Application No. PCT/JP2020/043737, dated Feb. 2, 2021, along with an English translation thereof.

*Primary Examiner* — Jared Fureman
*Assistant Examiner* — Duc M Pham
(74) *Attorney, Agent, or Firm* — Greenblum & Bernstein, P.L.C.

(57) ABSTRACT

A wiring module includes a flexible substrate, a sensor component (temperature sensor), a connecting member (bus bar), and a holding part-equipped relay member, wherein the holding part-equipped relay member includes: a relay member main body including a base part (first main plate) that is (Continued)

to be fixed to the flexible substrate and the bus bar, and a holding part (first holding piece) that is continuous with the first main plate; a pedestal part (housing) that is to be held by the first holding piece so as to be displaceable in a direction toward or away from the first main plate, and that is to be fixed to a position of the flexible substrate where the temperature sensor is mounted; and a biasing member that has elastic force, that has one end held by the first main plate, and that biases the housing in the direction away from the first main plate.

8 Claims, 11 Drawing Sheets

(51) Int. Cl.
*H01M 50/298* (2021.01)
*H01M 50/507* (2021.01)

(56) References Cited

FOREIGN PATENT DOCUMENTS

| | | |
|---|---|---|
| JP | 2013-206619 | 10/2013 |
| JP | 2016-018634 | 2/2016 |
| JP | 2016-072181 | 5/2016 |
| JP | 2019-074327 | 5/2019 |
| JP | 2020-016489 | 1/2020 |
| WO | 2020/110409 | 6/2020 |

* cited by examiner

WIRING MODULE AND POWER STORAGE MODULE

TECHNICAL FIELD

The technique disclosed by the present specification relates to a wiring module and a power storage module.

BACKGROUND ART

There is a known power storage apparatus that includes a power storage battery, a temperature sensor for detecting the surface temperature of the power storage battery, and a holding device that holds the temperature sensor. The holding device includes an elastic body, and the elastic body biases the temperature sensor so as to press the temperature sensor against the surface of the power storage battery. Accordingly, it is possible to stably detect the surface temperature of the power storage battery. Such a holding device requires a structure for taking on the reactive force from the elastic body, and is therefore supported by some kind of structural object included in the power storage apparatus, including, for example, a casing that accommodates the power storage battery, and a support member that supports a wiring member (see Patent Document 1).

CITATION LIST

Patent Document

Patent Document 1: JP 2013-206619A

SUMMARY OF INVENTION

Technical Problem

In recent years, for the purpose of achieving reductions in weight, cost, and so forth, power storage apparatuses that do not include a structural object such as a casing or a support member have been proposed. However, for such power storage apparatuses, it is difficult to secure a place for supporting the above-described structure that holds the sensor component while biasing the same.

Solution to Problem

A wiring module disclosed by the present specification is a wiring module that is to be attached to a power storage element including electrodes; including a flexible substrate; a sensor component mounted to the flexible substrate; a connecting member that is to be fixed to the electrodes; and a holding part-equipped relay member that connects the flexible substrate and the connecting member to each other, and that holds the sensor component, wherein the holding part-equipped relay member includes: a relay member main body including a base part that is to be fixed to the flexible substrate and the connecting member, and a holding part that is continuous with the base part; a pedestal part that is to be held by the holding part so as to be displaceable in a direction toward or away from the base part, and that is to be fixed to a portion of the flexible substrate where the sensor component is mounted; and a biasing member that has elastic force, that has one end held by the base part, and that biases the pedestal part in the direction away from the base part.

A power storage module disclosed by the present specification includes a power storage element including electrodes; and a wiring module that is to be attached to the power storage element, wherein the wiring module includes: a flexible substrate; a sensor component mounted to the flexible substrate; a connecting member that is to be fixed to the electrodes; and a holding part-equipped relay member that connects the flexible substrate and the connecting member to each other, and that holds the sensor component, and the holding part-equipped relay member includes: a relay member main body including a base part that is to be fixed to the flexible substrate and the connecting member, and a holding part that is continuous with the base part; a pedestal part that is to be held by the holding part so as to be displaceable in a direction toward or away from the base part, and that is to be fixed to a portion of the flexible substrate where the sensor component is mounted; and a biasing member that has elastic force, that has one end held by the base part, and that biases the pedestal part in the direction away from the base part.

Advantageous Effects of Invention

With the wiring module and the power storage module disclosed by the present specification, a structure that holds the sensor component while biasing the same is disposed in the wiring module, whereby a power storage module that does not include a structural object such as a casing or a support member can also be provided with the structure that holds the sensor component while biasing the same.

DESCRIPTION OF EMBODIMENTS

Figure 1:
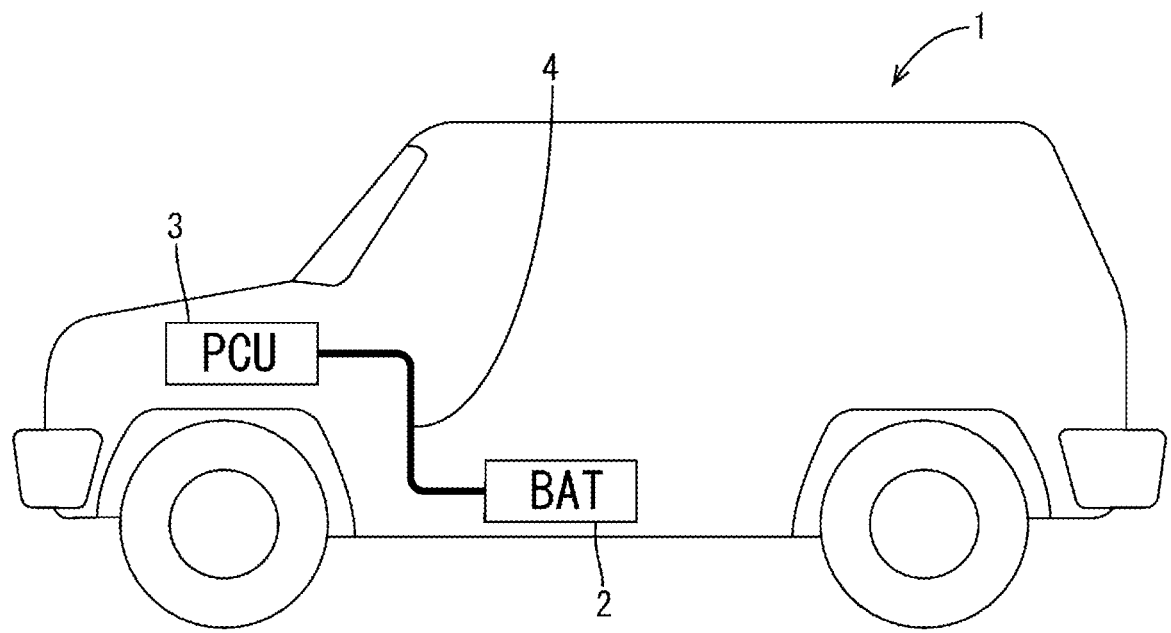
FIG. 1 is a schematic diagram showing a vehicle in which a power storage module according to Embodiment 1 is mounted.

Outline of Embodiments (1) A wiring module disclosed by the present specification is a wiring module that is to be attached to a power storage element including electrodes; including a flexible substrate; a sensor component mounted to the flexible substrate; a connecting member that is to be fixed to the electrodes; and a holding part-equipped relay member that connects the flexible substrate and the connecting member to each other, and that holds the sensor component, wherein the holding part-equipped relay member includes: a relay member main body including a base part that is to be fixed to the flexible substrate and the connecting member, and a holding part that is continuous with the base part; a pedestal part that is to be held by the holding part so as to be displaceable in a direction toward or away from the base part, and that is to be fixed to a portion of the flexible substrate where the sensor component is mounted; and a biasing member that has elastic force, that has one end held by the base part, and that biases the pedestal part in the direction away from the base part.

With the above-described configuration, the holding part-equipped relay member that connects the flexible substrate and the connecting member to each other has a structure that holds the sensor member while biasing the same. By disposing the structure that holds the sensor component while biasing the same in the wiring module in this manner, a power storage module that does not include a structural object such as a casing or a support member can also be provided with a structure that holds the sensor component while biasing the same.

(2) The relay member main body may be a single member including the base part and the holding part. A relay member main body having such a configuration can be produced in a small number of steps, for example, by punching or bending a metal plate member.

(3) The relay member main body may include the base part, and the holding part that is a member separate from the base part and that is to be fixed to the base part. With such a configuration, the base part and the holding part can each be made of a suitable material.

(4) The wiring module may be a vehicle wiring module that is to be used mounted in a vehicle. Even when vibration from the vehicle is transmitted to the wiring module, the sensor component can be biased toward the power storage element by the biasing member. This makes it possible to improve the measurement accuracy of the sensor component, and thus the wiring module can be suitably used for a vehicle in which vibration is generated while the vehicle is travelling.

(5) A power storage module disclosed by the present specification includes a power storage element including electrodes; and a wiring module that is to be attached to the power storage element, wherein the wiring module includes: a flexible substrate; a sensor component mounted to the flexible substrate; a connecting member that is to be fixed to the electrodes; and a holding part-equipped relay member that connects the flexible substrate and the connecting member to each other, and that holds the sensor component, and the holding part-equipped relay member includes: a relay member main body including a base part that is to be fixed to the flexible substrate and the connecting member, and a holding part that is continuous with the base part; a pedestal part that is to be held by the holding part so as to be displaceable in a direction toward or away from the base part, and that is to be fixed to a portion of the flexible substrate where the sensor component is mounted; and a biasing member that has elastic force, that has one end held by the base part, and that biases the pedestal part in the direction away from the base part.

(6) The power storage module may be a vehicle power storage module that is to be used mounted in a vehicle. Even when vibration from the vehicle is transmitted to the power storage module, the sensor component can be biased toward the power storage element by the biasing member. This makes it possible to improve the measurement accuracy of the sensor component, and thus the power storage module can be suitably used for a vehicle in which vibration is generated while the vehicle is travelling.

Details of Embodiments of the Present Disclosure

Specific examples of the technique disclosed by the present specification will be described below with reference to the drawings. It should be noted that the present invention is not limited to these examples, but is defined by the claims, and is intended to include all modifications which fall within the scope of the claims and the meaning and scope of equivalents thereof.

Embodiment 1

Embodiment 1, in which the present disclosure is applied to a power storage pack 2 that is mounted in a vehicle 1, will be described with reference to FIGS. 1 to 7. The power storage pack 2 is mounted in a vehicle 1 such as an electric automobile or a hybrid automobile, and is used as a motive source of the vehicle 1. In the following description, for a plurality of identical members, reference numerals may be assigned to some of the members, and reference numerals may be omitted for the other members.

Overall Configuration

As shown in FIG. 1, the electricity storage pack 2 is disposed in the vicinity of the center of the vehicle 1. A PCU 3 (Power Control Unit) is disposed in a front portion of the vehicle 1. The power storage pack 2 and the PCU 3 are connected to each other by a wire harness 4. The power storage pack 2 and the wire harness 4 are connected to each other by a connector (not shown). The power storage pack 2 includes a power storage module 5 including a plurality of power storage elements 10.

Figure 2:
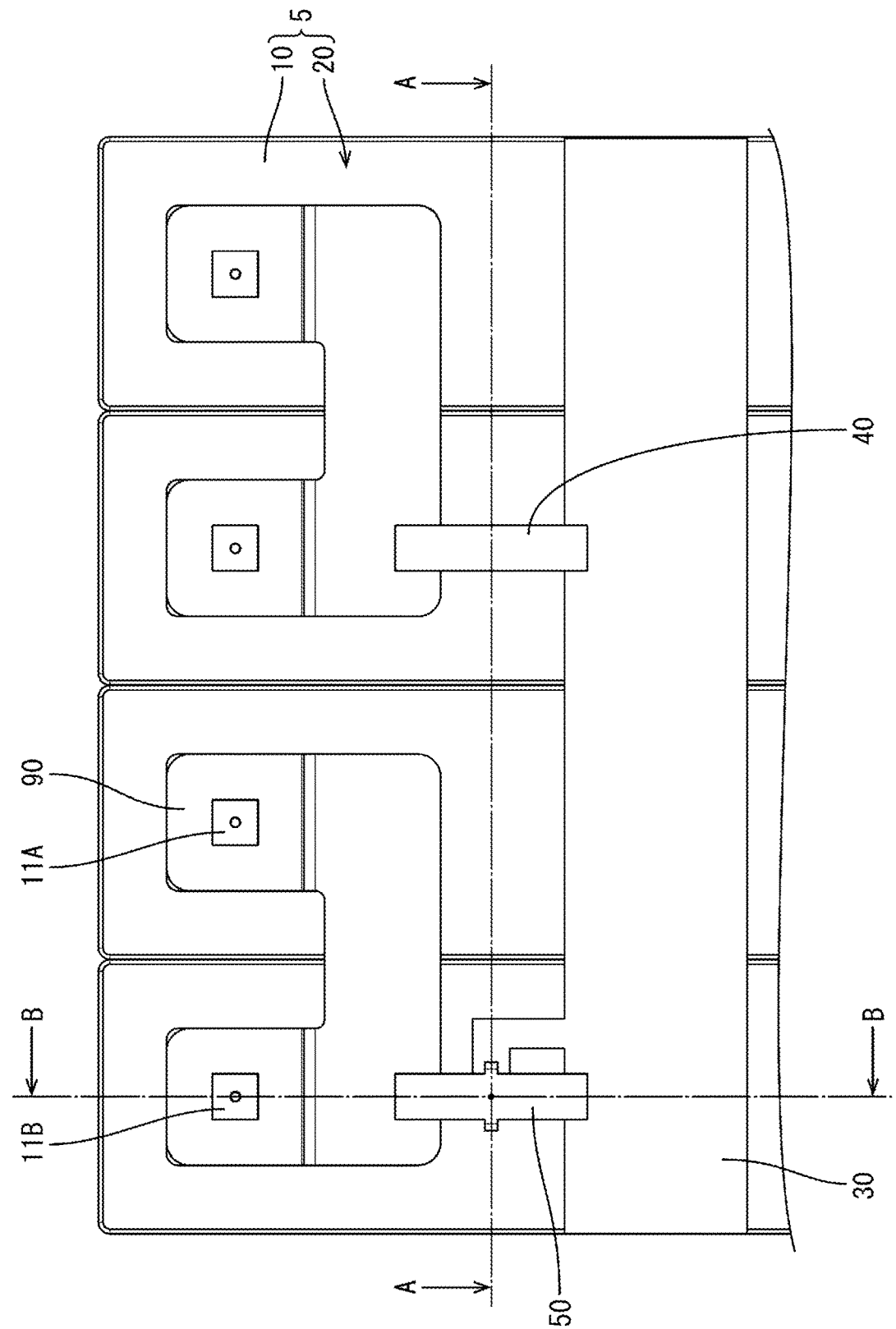
FIG. 2 is a plan view of the power storage module according to Embodiment 1.

As shown in FIG. 2, the power storage module 5 includes a plurality of power storage elements 10, and a wiring module 20 attached to the power storage elements 10.

Power Storage Element 10

The power storage elements 10 are secondary cells, for example. As shown in FIG. 2, each of the power storage elements 10 has an overall flat rectangular parallelepiped shape, and includes two electrode terminals 11A and 11B disposed on one surface (the front side in FIG. 2) thereof. One of the two electrode terminals 11A and 11B is a positive electrode terminal 11A, and the other is a negative electrode terminal 11B. The plurality of power storage elements 10 are arranged in a row. Two adjacent power storage elements 10 are arranged such that the electrode terminals 11A and 11B of different polarities are adjacent to each other, or in other words, such that the positive electrode terminal 11A of one power storage element 10 and the negative electrode terminal 11B of the other power storage element 10 adjacent thereto are adjacent to each other. The electrode terminals 11A and 11B each have a flat connection surface.

Wiring Module 20

As shown in FIG. 2, the wiring module 20 includes a flexible substrate 30, bus bars 90 (an example of a connecting member) fixed to the electrode terminals 11A and 11B, and a relay member 40 and a holding part-equipped relay member 50 that connect the flexible substrate 30 and the bus bars 90 to each other. The flexible substrate 30 is a flexible printed circuit board, for example.

Bus Bar 90

Each bus bar 90 is formed of a conductive metal plate member. Examples of the material of the bus bar 90 include copper, a copper alloy, aluminum, an aluminum alloy, and stainless steel (SUS). In the present embodiment, the bus bar 90 is made of aluminum. As shown in FIG. 2, each bus bar 90 is placed on top of the connection surfaces of a pair of adjacent electrode terminals 11A and 11B, and fixed thereto through laser welding. Thus, the two adjacent electrode terminals 11A and 11B are connected to each other.

Flexible Substrate 30 and Temperature Sensor 34

Figure 3:
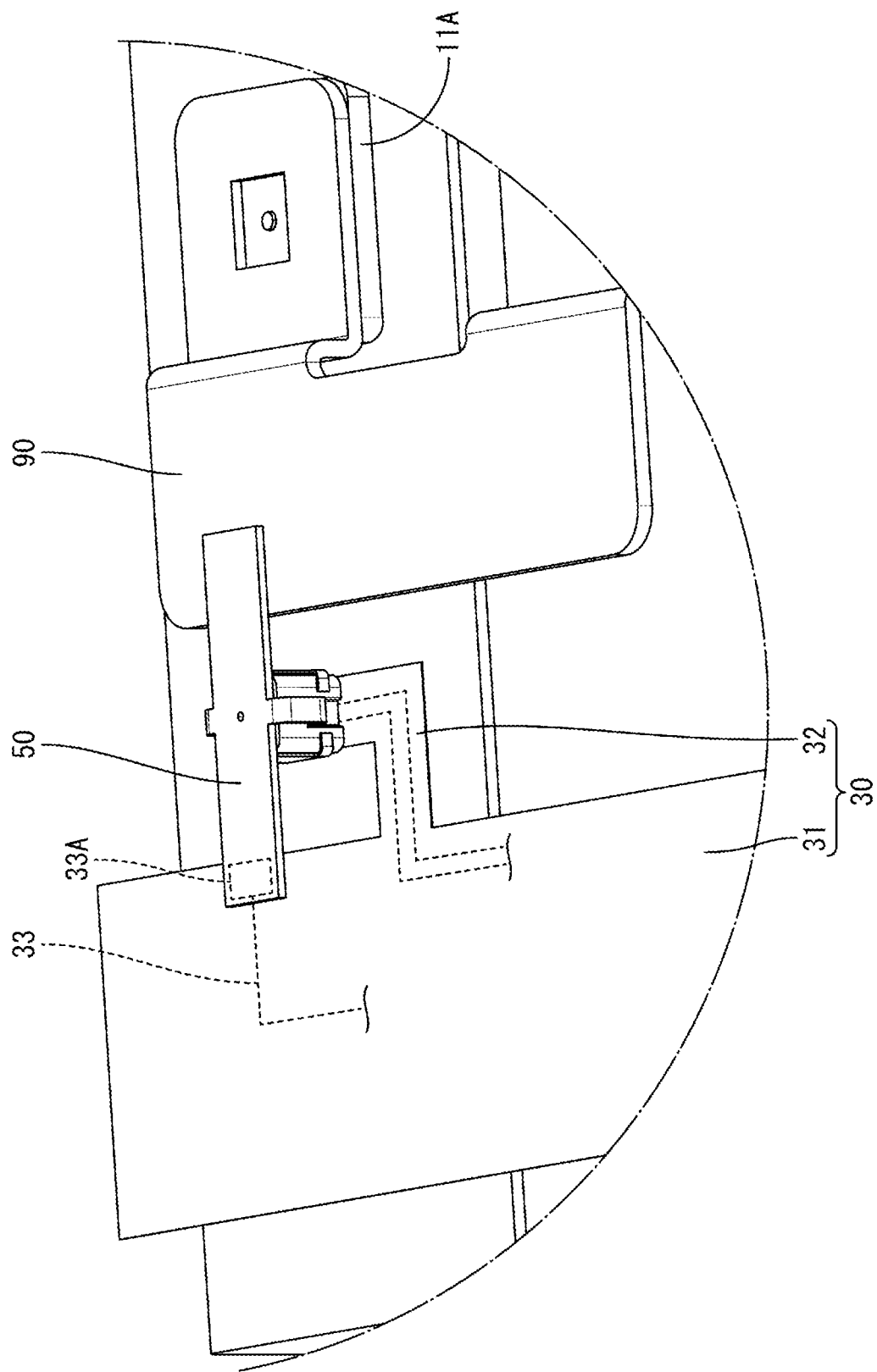
FIG. 3 is a partially enlarged perspective view of the power storage module according to Embodiment 1.

The flexible substrate 30 is a flexible sheet-shaped substrate, and includes, as shown in FIG. 3, a band-shaped substrate main body 31, and a thin band-shaped mounting part 32 that extends from the substrate main body 31. The flexible substrate 30 includes a plurality of conductive paths 33, and a resin film that covers the conductive paths 33. Each conductive path 33 is made of a metal such as copper or a copper alloy. One end of a conductive path 33 disposed on the substrate main body 31 serves as a connection land 33A for connecting the holding part-equipped relay member 50. The connection land 33A is exposed from the resin film.

Figure 4:
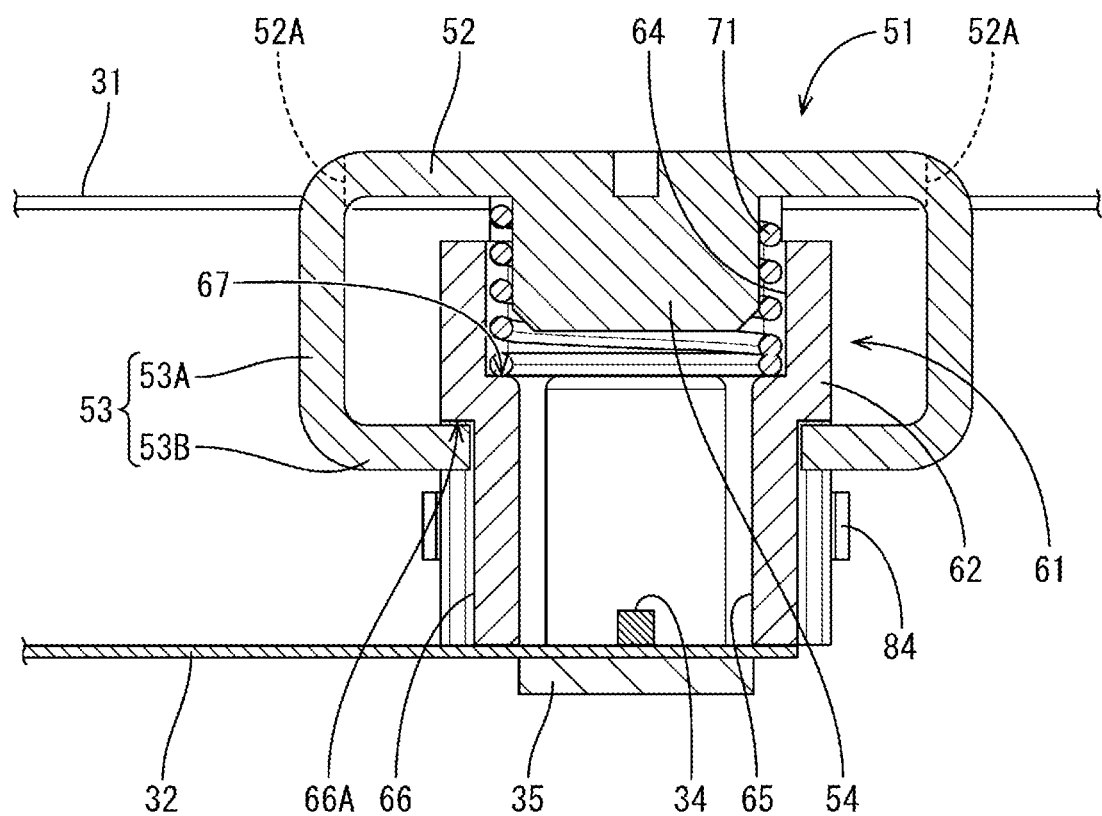
FIG. 4 is a cross-sectional view taken along the line A-A in FIG. 2.

As shown in FIG. 4, a temperature sensor 34 (an example of a sensor component) for detecting the surface temperature of the power storage element 10 is mounted to the mounting part 32. The temperature sensor 34 is a thermistor, for example. The temperature sensor 34 includes a pair of terminal parts, and the pair of terminal parts are connected, through soldering, to end portions of a pair of conductive paths 33 exposed from the resin film.

A reinforcement plate 35 is adhered to a surface (the lower surface in FIG. 4) of the mounting part 32 that is located opposite to a surface on which the temperature sensor 34 is mounted. The reinforcement plate 35 has a plate shape, and is bonded, for example, using an adhesive, to a position on the immediate back side of the position at which the temperature sensor 34 is disposed. Accordingly, the portion of the flexible substrate 30 where the temperature sensor 34 is mounted is reinforced. Preferably, the reinforcement plate 35 is made of a metal that has excellent heat conductivity, including, for example, aluminum and an aluminum alloy.

Relay Member 40 and Holding Part-Equipped Relay Member 50

The relay member 40 and the holding part-equipped relay member 50 are both members that electrically connect the conductive paths 33 and the bus bar 90 to each other. A connection land 33A and a bus bar 90 that are paired with each other are connected to each other by one of the relay member 40 and the holding part-equipped relay member 50.

The relay member 40 is a conductive metal plate member. Preferably, the relay member 40 is made of a metal material that can be favorably joined to both the conductive path 33 and the bus bar 90. In the present embodiment, the relay member 40 is made of nickel. One end portion of the relay member 40 is connected to the connection land 33A through soldering, for example. The other end portion thereof is connected to the bus bar 90 through laser welding, for example.

Figure 5:
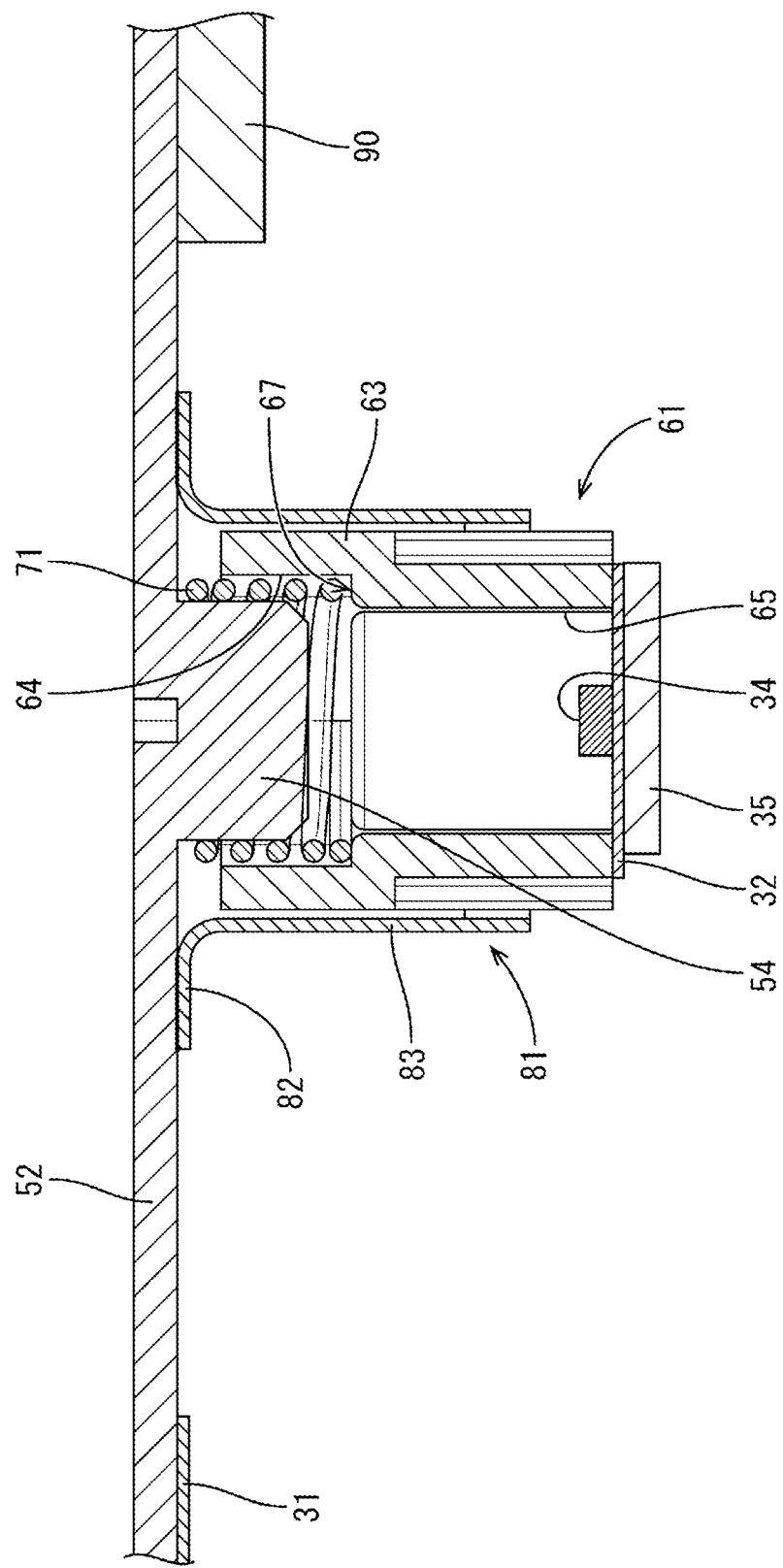
FIG. 5 is a cross-sectional view taken along the line B-B in FIG. 2.
Figure 6:
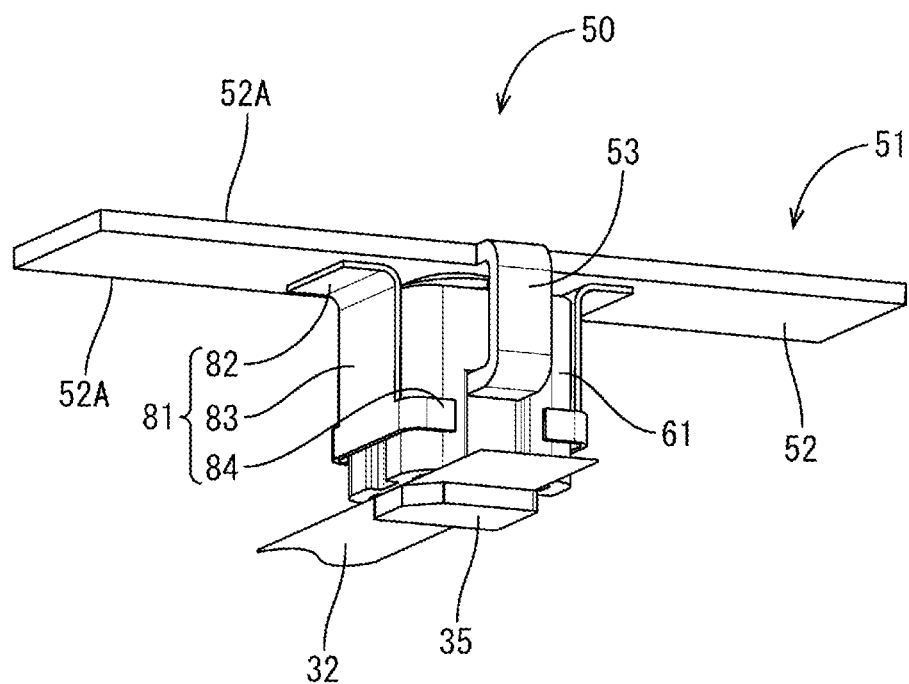
FIG. 6 is a perspective view showing a holding part-equipped relay member and a mounting part according to Embodiment 1.

As shown in FIGS. 4, 5, and 6, the holding part-equipped relay member 50 includes a relay member main body 51, a housing 61 (an example of a pedestal part), a biasing member 71, and a pair of auxiliary holding pieces 81.

The relay member main body 51 is conductive, and includes a first main plate 52 (an example of a base part), two first holding pieces 53 (an example of a holding part) that extend from the first main plate 52 and hold the housing 61, and a first holding protrusion 54 that protrudes from the first main plate 52. The relay member main body 51 is a seamless single member obtained by forming the first main plate 52, the first holding pieces 53, and the first holding protrusion 54 into a single piece from a sheet of a base material. Preferably, the relay member main body 51 is made of a metal material that can be favorably connected to both the conductive path 33 and the bus bar 90. In the present embodiment, the relay member main body 51 is made of nickel.

As shown in FIGS. 4 and 6, the first main plate 52 has a rectangular plate shape, and includes a pair of side edges 52A that are parallel to each other. As shown in FIG. 3, one end portion of the first main plate 52 is connected to the connection land 33A through soldering, for example. The other end portion thereof is connected to the bus bar 90 through laser welding, for example.

As shown in FIGS. 4 and 6, the two first holding pieces 53 extend from the respective corresponding side edges 52A of the first main plate 52. As shown in FIG. 4, the two first holding pieces 53 are disposed facing each other. Each of the first holding pieces 53 includes a holding piece main body 53A that extends from the first main plate 52, and an engaging piece 53B that extends from a distal end of the holding piece main body 53A. Each engaging piece 53B extends inward, or in other words, toward the counterpart first holding piece 53.

The first holding protrusion 54 is a cylindrical columnar protrusion for holding one end of the biasing member 71 in a positioned state, and is disposed at an intermediate position between the two first holding pieces 53, as shown in FIGS. 4 and 5.

The housing 61, which is made of synthetic resin, is held by the relay member main body 51, and is fixed to the mounting part 32, as shown in FIGS. 4 and 6. The housing 61 has an overall rectangular tube shape having openings at both ends thereof, and includes four side walls 62 and 63, as shown in FIGS. 4 and 5. Two of the four side walls 62 and 63 are first side walls 62 that are parallel to each other, and the other two are second side walls 63 that are perpendicular to the first side walls 62. The housing 61 is disposed in a direction perpendicular to the first main plate 52 such that one opening end thereof is opposed to the first main plate 52. About half of the housing 61 that is located on the first main plate 52 side (the upper side in FIG. 4) serves as a first accommodating part 64 capable of accommodating the biasing member 71 therein, and about half of the housing 61 located on the opposite side (the lower side in FIG. 4) serves as a second accommodating part 65 capable of accommodating the temperature sensor 34 therein.

As shown in FIGS. 4 and 5, the opening end of the second accommodating part 65 is bonded to the surface of the mounting part 32 using an adhesive, for example. The temperature sensor 34 is accommodated inside the second accommodating part 65.

As shown in FIG. 4, a holding groove 66 that extends from the opening end (the lower end in FIG. 4) of the second accommodating part 65 toward the first main plate 52 is provided in the outer surface of each first side wall 62. The two first holding pieces 53 are disposed so as to sandwich the housing 61 therebetween. Each of the holding piece main bodies 53A is disposed along the corresponding first side wall 62, and each of the engaging pieces 53B enters the corresponding holding grooves 66. Thus, the housing 61 is held by the relay member main body 51.

Each engaging piece 53B is configured to be movable inside the corresponding holding groove 66 along a direction (the vertical direction in FIG. 4) in which the holding groove 66 extends, whereby the housing 61 is displaceable in a direction (the vertical direction in FIG. 4) toward or away from the first main plate 52. A locking wall 66A that is perpendicular to the outer surface of the first side wall 62 is disposed at an end (the upper end in FIG. 4) of each holding groove 66 that is located on the first main plate 52 side, and the housing 61 is restricted from coming loose from the first main plate 52 as a result of the engaging pieces 53B abutting against the locking walls 66A.

As shown in FIGS. 4 and 5, an inner wall of the second accommodating part 65 protrudes inward of an inner wall of the first accommodating part 64, and a stepped surface is present at a boundary position between the first accommodating part 64 and the second accommodating part 65. The stepped surface faces the first main plate 52, and serves as a contact surface 67 with which the biasing member 71 comes into contact.

As shown in FIGS. 4 and 5, the biasing member 71 is a metal coil spring formed by a spirally wound metal wire rod made of SUS, and is configured to be elastically deformable in the axial direction thereof. The biasing member 71 has one end in contact with the first main plate 52, and the first holding protrusion 54 enters the biasing member 71 from the one end. Accordingly, the one end of the biasing member 71 is held in the positioned state by the first main plate 52, whereby the biasing member 71 is prevented from assuming an improper orientation where it is inclined relative to the first main plate 52. The majority of the biasing member 71 excluding the one end is accommodated in the first accommodating part 64, and the other end of the biasing member 71 is in contact with the contact surface 67. The biasing member 71 is held in a slightly compressed state between the first main plate 52 and the contact surface 67.

Each auxiliary holding piece 81 is a separate member from the relay member main body 51, is connected to the first main plate 52, and assists the first holding piece 53 in holding the housing 61, as shown in FIGS. 5 and 6. Preferably, the auxiliary holding piece 81 is made of an inexpensive metal material that can be favorably joined to the first main plate 52. In the present embodiment, the auxiliary holding piece 81 is made of iron.

As shown in FIG. 5, the two auxiliary holding pieces 81 are disposed on opposite sides of the housing 61. As shown in FIGS. 5 and 6, each of the auxiliary holding pieces 81 includes a first fixed piece 82, a restricting wall 83, and two restricting pieces 84. The first fixed piece 82 has a plate shape, and is fixed to the first main plate 52 through soldering. The restricting wall 83 has a plate shape, extends from the first fixed piece 82, and is disposed along the second side wall 63. The two restricting pieces 84 have the shape of an elongated plate piece, and extend from the respective restricting walls 83 in directions opposite to each other. Each of the restricting pieces 84 extends to the vicinity of the holding groove 66 along the first side wall 62. The auxiliary holding pieces 81 prevent the housing 61 from assuming an improper orientation where it is inclined relative to the first main plate 52.

Attachment of Wiring module 20 to Power Storage Elements 10

When the wiring module 20 is in an isolated state in which the wiring module 20 is not attached to the power storage elements 10, the housing 61 is biased by the biasing member 71 in the direction away from the first main plate 52, as shown in FIGS. 4 and 5. There is a gap between the housing 61 and the first main plate 52. In this state, the distance to the first main plate 52 from the surface (the lower surface in FIG. 4) of the reinforcement plate 35 adhered to the mounting part 32 is larger than the distance between the first main plate 52 and the surface of the power storage element 10 in a state in which the wiring module 20 is attached to the power storage elements 10.

When attaching the wiring module 20 to the power storage elements 10, the wiring module 20 is held on the plurality of power storage elements 10 that are arranged side by side, and the bus bars 90 are fixed to the electrode terminals 11A and 11B through laser welding.

Figure 7:
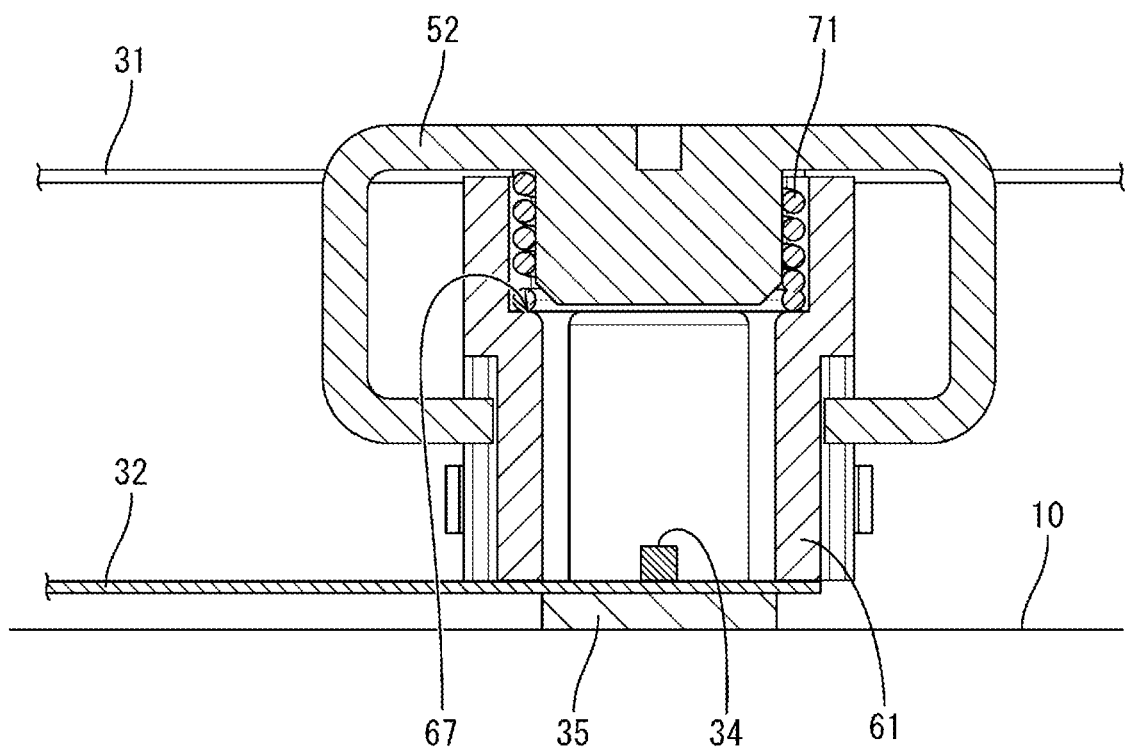
FIG. 7 is a partially enlarged cross-sectional view showing a state in which a wiring module is fixed to a power storage element, taken along the same position as that of the line A-A in FIG. 2.

As shown in FIG. 7, in a state in which the wiring module 20 is attached to the power storage elements 10, the housing 61 and the mounting part 32 that is fixed to the housing 61 are sandwiched between the first main plate 52 and the surface of the power storage element 10, and the reinforcement plate 35 is in contact with the surface of the power storage element 10. The biasing member 71 is elastically contracted as a result of being sandwiched between the contact surface 67 and the first main plate 52, and biases, using the elastic restoring force, the housing 61 and the mounting part 32 toward the power storage element 10. Consequently, the surface of the reinforcement plate 35 is pressed against the surface of the power storage element 10. Heat generated by the power storage element 10 is transferred to the temperature sensor 34 through the reinforcement plate 35 and the mounting part 32.

Operation and Effects

As described above, according to the present embodiment, the power storage module 5 includes power storage elements 10 each including electrode terminals 11A and 11B, and a wiring module 20 that is to be attached to the power storage elements 10. The wiring module 20 includes a flexible substrate 30, a temperature sensor 34 mounted to the flexible substrate 30, bus bars 90 that are to be fixed to the electrode terminals 11A and 11B, and a holding part-equipped relay member 50 that connects the flexible substrate 30 and a bus bar 90 to each other, and that holds the temperature sensor 34, wherein the holding p art-equipped relay member 50 includes: a relay member main body 51 including a first main plate 52 that is to be fixed to the flexible substrate 30 and the bus bar 90, and a first holding piece 53 that is continuous with the first main plate 52; a housing 61 that is to be held by the first holding piece 53 so as to be displaceable in a direction toward or away from the first main plate 52, and that is to be fixed to a portion of the flexible substrate 30 where the temperature sensor 34 is mounted; and a biasing member 71 that has an elastic force, that has one end held by the first main plate 52, and that biases the housing 61 in the direction away from the first main plate 52.

With the above-described configuration, a structure in which the holding part-equipped relay member 50 that connects the flexible substrate 30 and the bus bar 90 to each other holds the temperature sensor 34 while biasing the same is disposed in the wiring module 20, whereby a power storage module 5 that does not include a structural object such as a casing or a support member can also be provided with a structure that holds the temperature sensor 34 while biasing the same.

The relay member main body 51 is a single member including the first main plate 52 and the first holding pieces 53. A relay member main body 51 having such a structure can be produced in a small number of steps, for example, by punching or bending a metal plate member.

The wiring module 20 according to the present embodiment is a vehicle wiring module 20 that is to be used mounted in the vehicle 1. Also, the power storage module 5 according to the present embodiment is a vehicle power storage module 5 that is to be used mounted in the vehicle 1. Even when vibration from the vehicle 1 is transmitted to the wiring module 20 and the power storage module 5, the reinforcement plate 35 can be brought into contact with the power storage element 10 by the biasing member 71. This allows heat generated by the power storage element 10 to be transferred to the temperature sensor 34 through the reinforcement plate 35, thus making it possible to improve the measurement accuracy of the temperature sensor 34. Thus, the wiring module 20 and the power storage module 5 according to the present embodiment can be suitably used for the vehicle 1 in which vibration is generated while the vehicle 1 is travelling.

Embodiment 2

Figure 8:
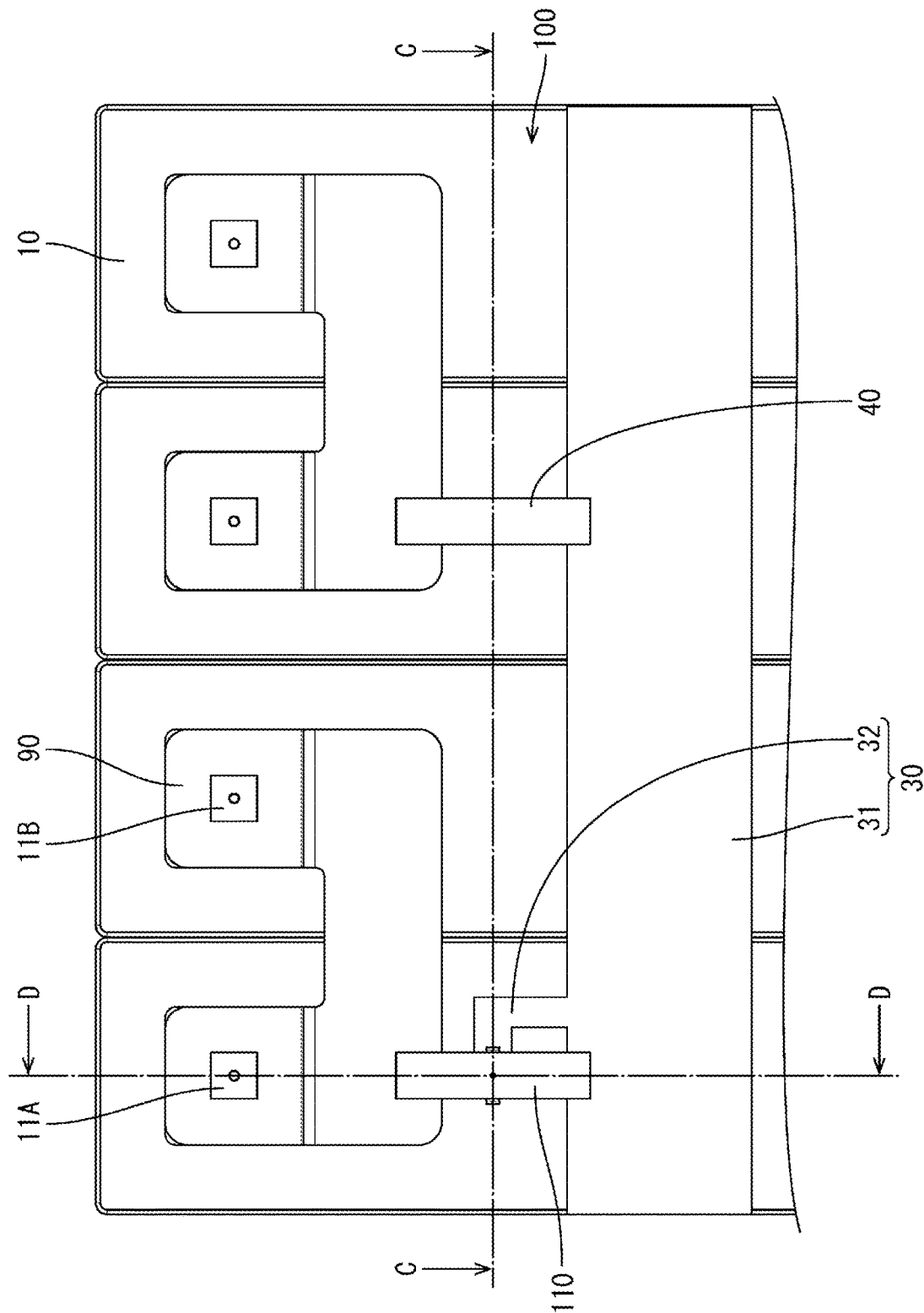
FIG. 8 is a plan view of a power storage module according to Embodiment 2.

Next, Embodiment 2 will be described with reference to FIGS. 8 to 10. As in the case of Embodiment 1, a wiring module 100 according to the present embodiment is attached to a plurality of power storage elements 10. As shown in FIG. 8, the wiring module 100 includes a flexible substrate 30, bus bars 90 that are to be fixed to electrode terminals 11A and 11B, and a relay member 40 and a holding part-equipped relay member 110 that connect the flexible substrate 30 and the bus bars 90 to each other. As in the case of Embodiment 1, a temperature sensor 34 is mounted to a mounting part 32 of the flexible substrate 30. In the present embodiment, the same components as those of Embodiment 1 are denoted by the same reference numerals, and the illustrations thereof have been omitted.

Figure 9:
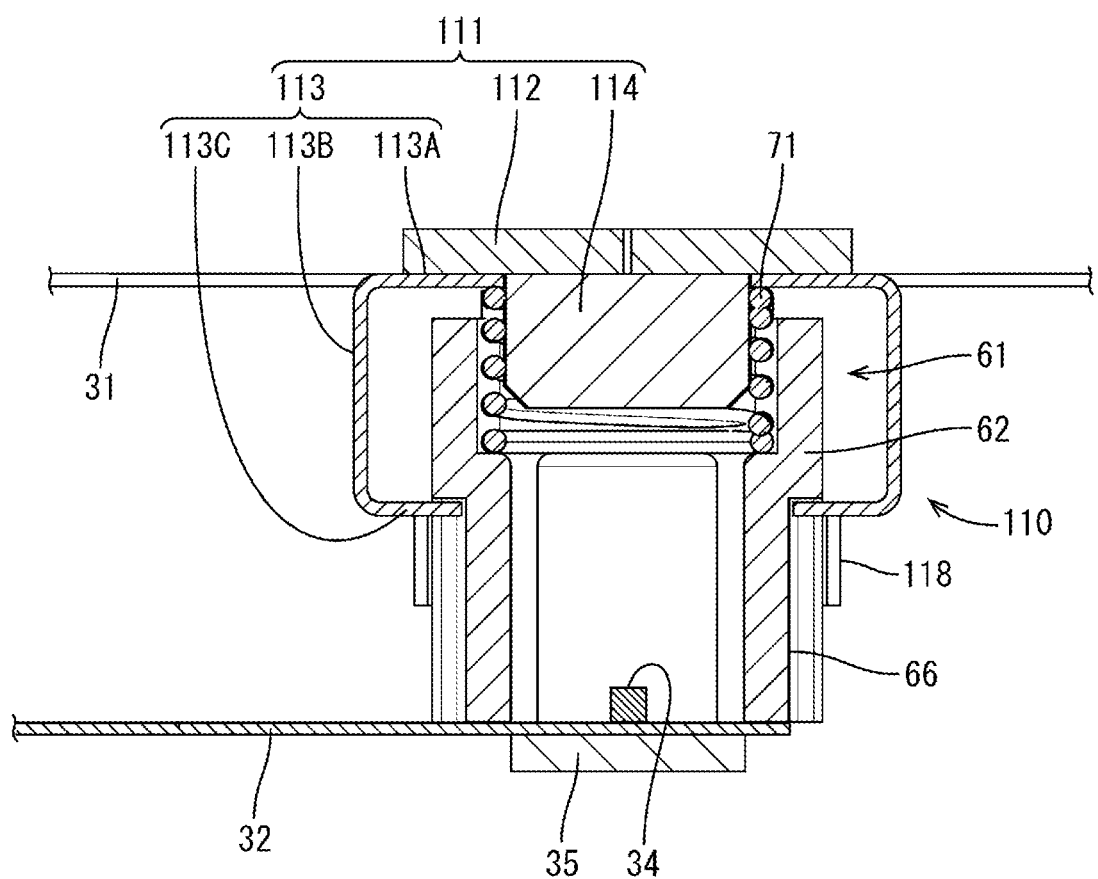
FIG. 9 is a cross-sectional view taken along the line C-C in FIG. 8.
Figure 10:
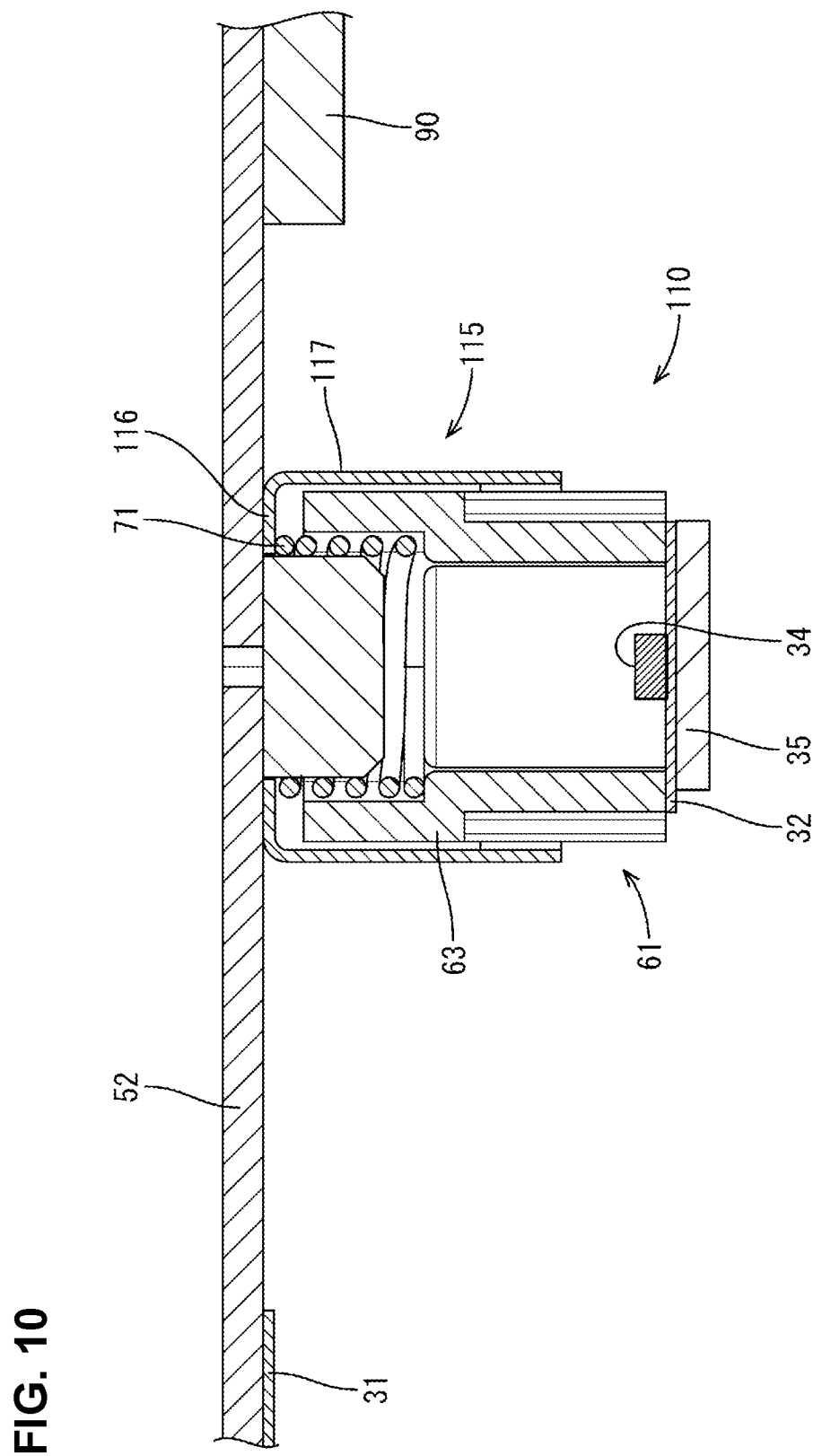
FIG. 10 is a cross-sectional view taken along the line D-D in FIG. 8.

As shown in FIGS. 9 and 10, the holding part-equipped relay member 110 includes a relay member main body 111, a housing 61, a biasing member 71, and a pair of auxiliary holding pieces 115. As shown in FIG. 9, the relay member main body 111 includes a second main plate 112 (an example of a base part), a pair of second holding pieces 113 (an example of a holding part), and a second holding protrusion 114.

The second main plate 112 is a conductive metal plate member. Preferably, the second main plate 112 is made of a metal material that can be favorably joined to both the conductive paths 33 and the bus bars 90. In the present embodiment, the second main plate 112 is made of nickel. As in the case of Embodiment 1, one end portion of the second main plate 112 is connected to the connection land 33A through soldering, for example. The other end portion thereof is connected to the bus bar 90 through laser welding, for example.

As shown in FIG. 9, each second holding piece 113 is a member separate from the second main plate 112, is connected to the second main plate 112, and holds the housing 61. Preferably, the second holding piece 113 is made of an inexpensive metal material that can be favorably joined to the second main plate 112. In the present embodiment, the second holding piece 113 is made of iron.

Each of the second holding pieces 113 includes a second fixed piece 113A, a holding piece main body 113B, and an engaging piece 113C. The second fixed piece 113A has a plate shape, and is fixed to the second main plate 112 through soldering. The holding piece main body 113B has a plate shape, and extends from the second fixed piece 113A. The engaging piece 113C has the shape of a plate piece, and extends from a distal end of the holding piece main body 113B. The two second holding pieces 113 are disposed facing each other. Each engaging piece 113C extends inward, or in other words, toward the counterpart second holding piece 113.

As shown in FIG. 9, the second holding protrusion 114 is a member separate from the second main plate 112, is connected to the second main plate 112, and holds one end of the biasing member 71. The second holding protrusion 114 has a columnar shape, and is fixed to the second main plate 112 through soldering. The second holding protrusion 114 is disposed at an intermediate position between the two second holding pieces 113.

The two second holding pieces 113 are disposed so as to sandwich the housing 61 therebetween. Each of the holding piece main bodies 113B is disposed along the corresponding first side wall 62, and each of the engaging pieces 113C enters the corresponding holding groove 66. Accordingly, the housing 61 is held by the relay member main body 111. The housing 61 is configured to be displaceable in a direction toward or away from the second main plate 112.

As shown in FIG. 10, the two auxiliary holding pieces 115 are disposed on opposite sides of the housing 61. As shown in FIGS. 9 and 10, each of the auxiliary holding pieces 115 includes a third fixed piece 116, a restricting wall 117, and two restricting pieces 118. As shown in FIG. 10, the third fixed piece 116 has a plate shape, and is fixed to the first main plate 52 through soldering. As shown in FIG. 10, the restricting wall 117 has a plate shape, extends from the third fixed piece 116, and is disposed along the second side wall 63. The two restricting pieces 118 each have the shape of an elongated plate piece, and extend from the respective restricting walls 83 in directions opposite to each other. As shown in FIG. 9, each of the restricting pieces 118 extends to the vicinity of the holding groove 66 along the corresponding first side wall 62. The auxiliary holding pieces 115 prevent the housing 61 from assuming an improper orientation where it is inclined relative to the first main plate 52.

The same effects as those of Embodiment 1 can also be achieved by the wiring module 100 according to the present embodiment. In addition, the relay member main body 111 includes the second main plate 112, and the second holding pieces 113 that are members separate from of the second main plate 112, and that are fixed to the second main plate 112, and thus the second main plate 112 and the second holding piece 113 can each be made of a suitable material.

Embodiment 3

Figure 11:
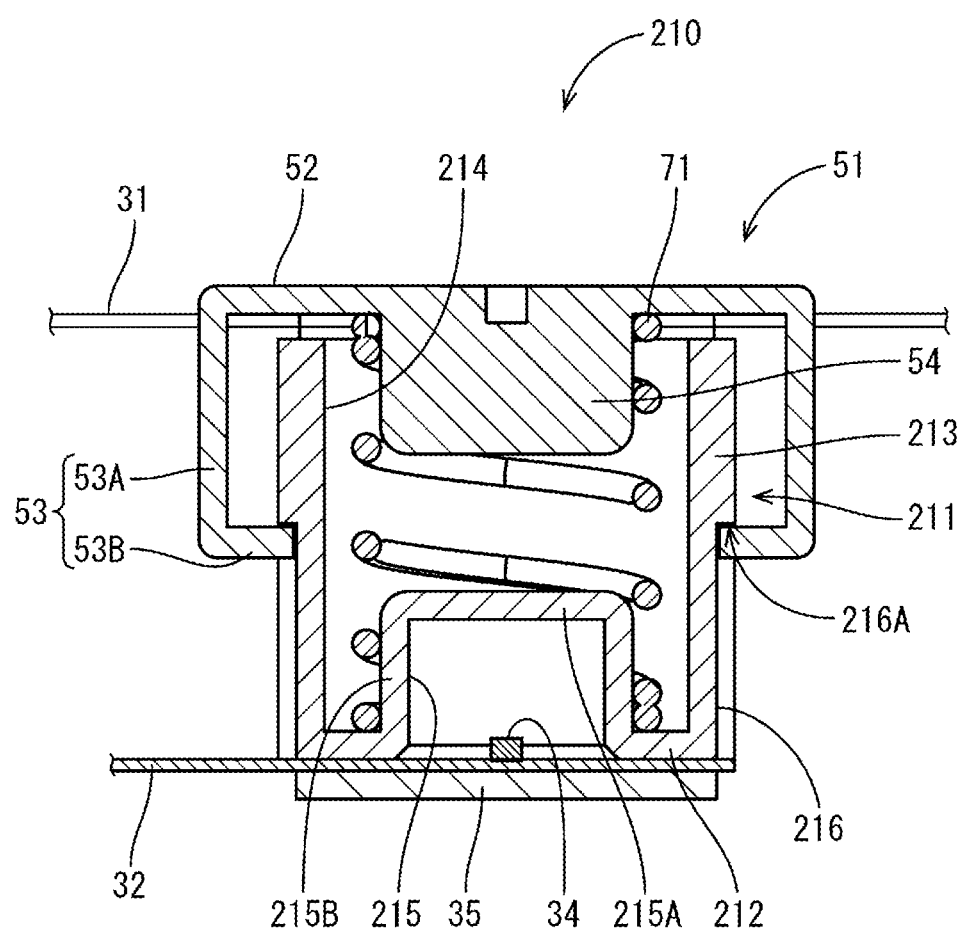
FIG. 11 is a cross-sectional view showing a holding part-equipped relay member according to Embodiment 3, taken along the same position as the line A-A in FIG. 2.

Next, Embodiment 3 will be described with reference to FIG. 11. A holding part-equipped relay member 210 according to the present embodiment includes a relay member main body 51, a housing 211 (an example of a pedestal part), and a biasing member 71. In the present embodiment, the same components as those of Embodiment 1 are denoted by the same reference numerals, and the illustrations thereof have been omitted.

The housing 211 includes a circular bottom wall 212, and a cylindrical peripheral wall 213 that extends from a peripheral edge of the bottom wall 212. One end of the peripheral wall 213 that is located opposite to the bottom wall 212 has an opening. The housing 211 is disposed in an orientation that is perpendicular to the first main plate 52 such that one end thereof on the opening side faces the first main plate 52. The internal space of the housing 211 serves as a third accommodating part 214 capable of accommodating the biasing member 71.

The housing 211 includes an accommodating recess 215 that is recessed from the outer surface of the bottom wall 212. The accommodating recess 215 is defined by a raised bottom part 215A that is disposed inside the third accommodating part 214 and is parallel to the bottom wall 212, and a cylindrical upright wall part 215B that extends from the raised bottom part 215A and is continuous with the bottom wall 212.

The bottom wall 212 is bonded to the surface of the mounting part 32 using an adhesive, for example. The temperature sensor 34 is accommodated inside the accommodating recess 215.

Two holding grooves 216 that extend from the bottom wall 212 toward the first main plate 52 are provided in the outer surface of the peripheral wall 213. Two first holding pieces 53 are disposed so as to sandwich the housing 211 therebetween. Each of the holding piece main bodies 53A is disposed along the peripheral wall 213, and each of the engaging pieces 53B enters the corresponding holding groove 66. Accordingly, the housing 211 is held by the relay member main body 51.

Each engaging piece 53B is configured to be movable inside the corresponding holding groove 216 in a direction (the vertical direction in FIG. 11) in which the holding groove 216 extends, whereby the housing 211 is displaceable in a direction (the vertical direction in FIG. 11) toward or away from the first main plate 52. A locking wall 216A that is perpendicular to the outer surface of the peripheral wall 213 is disposed at an end (the upper end in FIG. 11) of each of the holding grooves 216 that is located on the first main plate 52 side, and the housing 211 is restricted from coming loose from the first main plate 52 by the engaging pieces 53B abutting against the locking walls 216A.

One end of the biasing member 71 is in contact with the first main plate 52. The majority of the biasing member 71 excluding the one end is accommodated in the third accommodating part 214, and the other end thereof is in contact with the bottom wall 212. The first holding protrusion 54 enters the biasing member 71 from the one end of the biasing member 71, and the accommodating recess 215 enters the biasing member 71 from the other end thereof. The biasing member 71 is held in a slightly contracted state between the first main plate 52 and the bottom wall 212.

The same effects as those of Embodiment 1 can also be achieved by the present embodiment. In addition, since the entirety of a portion inside the housing 211 that extends from the bottom wall 212 to the opening end located on the opposite side serves as the third accommodating part 214 that accommodates the biasing member 71, the height of the holding part-equipped relay member 210 can be reduced as compared with that in Embodiment 1.

Other Embodiments (1) Although the biasing member 71 is a compression coil spring in the above-described embodiments, the biasing member may be a plate spring, or may be an elastic body made of rubber.

(2) Although each second holding piece 113 is made of metal in Embodiment 2, the holding parts may be made of resin, and the second holding pieces 113 may be fixed to the base part using an adhesive.

(3) Although the sensor component is the temperature sensor 34 in the above-described embodiments, the sensor component may be a vibration sensor or an angle sensor, for example.

(4) Although the biasing member 71 is positioned by the first holding protrusion 54 or the second holding protrusion 114 in the above-described embodiments, the biasing member may be positioned, for example, by a cut-and-raised piece formed by cutting and raising the base part.

LIST OF REFERENCE NUMERALS

1 Vehicle
2 Power storage pack
3 PCU
4 Wire harness
5 Power storage module
10 Power storage element
11A Positive electrode terminal (electrode terminal)
11B Negative electrode terminal (electrode terminal)
20, 100 Wiring module
30 Flexible substrate
31 Substrate main body
32 Mounting part
33 Conductive path
33A Connection land
34 Temperature sensor (sensor component)
35 Reinforcement plate
40 Relay member
50, 110, 210 Holding part-equipped relay member
51, 111 Relay member main body
52 First main plate (base part)
52A Side edge
53 First holding piece (holding part)
53A, 113B Holding piece main body
53B, 113C Engaging piece
54 First holding protrusion
61, 211 Housing (pedestal part)
62 First side wall
63 Second side wall
64 First accommodating part
65 Second accommodating part
66, 216 Holding groove
66A, 216A Locking wall
67 Contact surface
71 Biasing member
81, 115 Auxiliary holding piece
82 First fixed piece
83, 117 Restricting wall
84, 118 Restricting piece
90 Bus bar (connecting member)
112 Second main plate (base part)
113 Second holding piece (holding part)
113A Second fixed piece
114 Second holding protrusion
116 Third fixed piece
212 Bottom wall
213 Peripheral wall
214 Third accommodating part
215 Accommodating recess
215A Raised bottom part
215B Upright wall part

The invention claimed is:

1. A wiring module that is to be attached to a power storage element including electrodes; comprising
   a flexible substrate;
   a sensor component mounted to the flexible substrate;
   a connecting member that is to be fixed to the electrodes; and
   a holding part-equipped relay member that connects the flexible substrate and the connecting member to each other, and that holds the sensor component,
   wherein the holding part-equipped relay member includes:

a relay member main body including a base part that is to be fixed to the flexible substrate and the connecting member, and a holding part that is continuous with the base part;
a pedestal part that is to be held by the holding part so as to be displaceable in a direction toward or away from the base part, and that is to be fixed to a portion of the flexible substrate where the sensor component is mounted; and
a biasing member that has elastic force, that has one end held by the base part, and that biases the pedestal part in the direction away from the base part.

2. The wiring module according to claim 1,
wherein the relay member main body is a single member including the base part and the holding part.

3. The wiring module according to claim 2,
wherein the wiring module is a vehicle wiring module that is to be used mounted in a vehicle.

4. The wiring module according to claim 1,
wherein the relay member main body includes the base part, and the holding part that is a member separate from the base part and that is to be fixed to the base part.

5. The wiring module according to claim 4,
wherein the wiring module is a vehicle wiring module that is to be used mounted in a vehicle.

6. The wiring module according to claim 1,
wherein the wiring module is a vehicle wiring module that is to be used mounted in a vehicle.

7. A power storage module comprising:
a power storage element including electrodes; and
a wiring module that is to be attached to the power storage element,
wherein the wiring module includes:
a flexible substrate;
a sensor component mounted to the flexible substrate;
a connecting member that is to be fixed to the electrodes; and
a holding part-equipped relay member that connects the flexible substrate and the connecting member to each other, and that holds the sensor component, and
the holding part-equipped relay member includes:
a relay member main body including a base part that is to be fixed to the flexible substrate and the connecting member, and a holding part that is continuous with the base part;
a pedestal part that is to be held by the holding part so as to be displaceable in a direction toward or away from the base part, and that is to be fixed to a portion of the flexible substrate where the sensor component is mounted; and
a biasing member that has elastic force, that has one end held by the base part, and that biases the pedestal part in the direction away from the base part.

8. The power storage module according to claim 7,
wherein the power storage module is a vehicle power storage module that is to be used mounted in a vehicle.

* * * * *